US012195113B2

(12) United States Patent
Pantaleo et al.

(10) Patent No.: US 12,195,113 B2
(45) Date of Patent: Jan. 14, 2025

(54) RECONFIGURABLE WHEEL-TRACK ASSEMBLY WITH BOWTIE CONFIGURATION

(71) Applicant: CARNEGIE MELLON UNIVERSITY, Pittsburgh, PA (US)

(72) Inventors: Richard Pantaleo, Pittsburgh, PA (US); Dimitrios Apostolopoulos, Pittsburgh, PA (US); Edward Mutschler, Pittsburgh, PA (US); Matthew Glisson, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 599 days.

(21) Appl. No.: 17/433,802

(22) PCT Filed: Apr. 29, 2020

(86) PCT No.: PCT/US2020/030395
§ 371 (c)(1),
(2) Date: Aug. 25, 2021

(87) PCT Pub. No.: WO2020/223298
PCT Pub. Date: Nov. 5, 2020

(65) Prior Publication Data
US 2022/0144357 A1   May 12, 2022

Related U.S. Application Data

(60) Provisional application No. 62/840,201, filed on Apr. 29, 2019.

(51) Int. Cl.
*B62D 55/10* (2006.01)
*B60B 19/02* (2006.01)
(Continued)

(52) U.S. Cl.
CPC .............. *B62D 55/10* (2013.01); *B60B 19/02* (2013.01); *B60B 19/12* (2013.01); *B62D 55/04* (2013.01); *B62D 55/12* (2013.01); *B62D 55/14* (2013.01)

(58) Field of Classification Search
CPC ........ B62D 55/04; B62D 55/10; B62D 55/12; B62D 55/14; B60B 19/02
(Continued)

(56) References Cited

U.S. PATENT DOCUMENTS 2,173,793 A    9/1939  Doblhoff
5,492,390 A    2/1996  Kugelmann, Sr.
(Continued)

FOREIGN PATENT DOCUMENTS

CN    102514446 A      6/2012
CN    104443088 A  *   3/2015
(Continued)

OTHER PUBLICATIONS

CN-105564148-A translation (Year: 2016).*
(Continued)

*Primary Examiner* — Christopher B Wehrly
(74) *Attorney, Agent, or Firm* — KDW Firm PLLC

(57) ABSTRACT

The Reconfigurable Wheel-Track (RWT) device is a novel mechanism that allows a wheel to transform into a track, and vice versa. The wheel mode allows a vehicle to travel quickly over smooth and semi-rough terrain, then, on-the-fly, transform rapidly into a powered track mode for crossing extreme terrain. The reconfigurable wheeltrack device comprises several main components: an outer tire/tread, a drive mechanism for driving the tread when in track mode and a reconfiguration mechanism that facilitates the transformation from wheel mode to track mode and vice versa. The reconfigurable wheel-track includes sensing, actuation, and (Continued)

controls to facilitate efficient and effective transitions, and securely maintain each wheel and track shape.

20 Claims, 6 Drawing Sheets

(51) Int. Cl.
*B60B 19/12* (2006.01)
*B62D 55/04* (2006.01)
*B62D 55/12* (2006.01)
*B62D 55/14* (2006.01)

(58) Field of Classification Search
USPC ....... 180/9.1, 9.21, 6.54, 6.58, 6.7; 280/5.22
See application file for complete search history.

(56) References Cited

U.S. PATENT DOCUMENTS

| | | | |
|---|---|---|---|
| 6,422,576 B1 * | 7/2002 | Michaeli | B62D 55/02 |
| | | | 280/5.22 |
| 9,522,708 B2 | 12/2016 | He | |
| 9,796,434 B2 | 10/2017 | Alidan | |
| 2008/0061627 A1 * | 3/2008 | Spector | B62D 55/305 |
| | | | 305/180 |
| 2011/0037311 A1 | 2/2011 | Stolkin | |
| 2014/0035355 A1 | 2/2014 | He | |

FOREIGN PATENT DOCUMENTS

| | | | | |
|---|---|---|---|---|
| CN | 105564148 A | * | 5/2016 | ............. B60B 19/02 |
| CN | 105774930 A | | 7/2016 | |
| CN | 105882774 A | * | 8/2016 | |
| CN | 109131610 A | * | 1/2019 | ............. B62D 55/04 |
| CN | 109383646 A | | 2/2019 | |
| CN | 109649075 A | * | 4/2019 | ............. A62C 27/00 |
| CN | 111096113 A | | 5/2020 | |
| CN | 210455005 U | | 5/2020 | |
| CN | 210617739 U | | 5/2020 | |
| WO | WO-2019025929 A1 | * | 2/2019 | |

OTHER PUBLICATIONS

CN-104443088-A translation (Year: 2015).*
CN-105882774-A translation (Year: 2016).*
CN-109131610-A translation (Year: 2019).*
CN-109649075-A translation (Year: 2019).*
International Search Report and Written Opinion for International Patent Application No. PCT/US20/30395 mailed on Aug. 3, 2020, 8 pages.
Reconfigurable Wheel Track & Extreme Travel Suspension by DARPA (DPCcars) Jun. 24, 2018 (Jun. 24, 2018) [online] retrieved from <URL:https://www.youtube.com/watch?v=8iq0Dh0Czls> entire document, especially demonstration 0:00-0:29.
International Search Report and Written Opinion for International Patent Application No. PCT/US2020/030392 mailed on Aug. 4, 2020, 9 pages.
International Search Report and Written Opinion for International Patent Application No. PCT/US20/30404 mailed on Aug. 3, 2020, 8 pages.

* cited by examiner

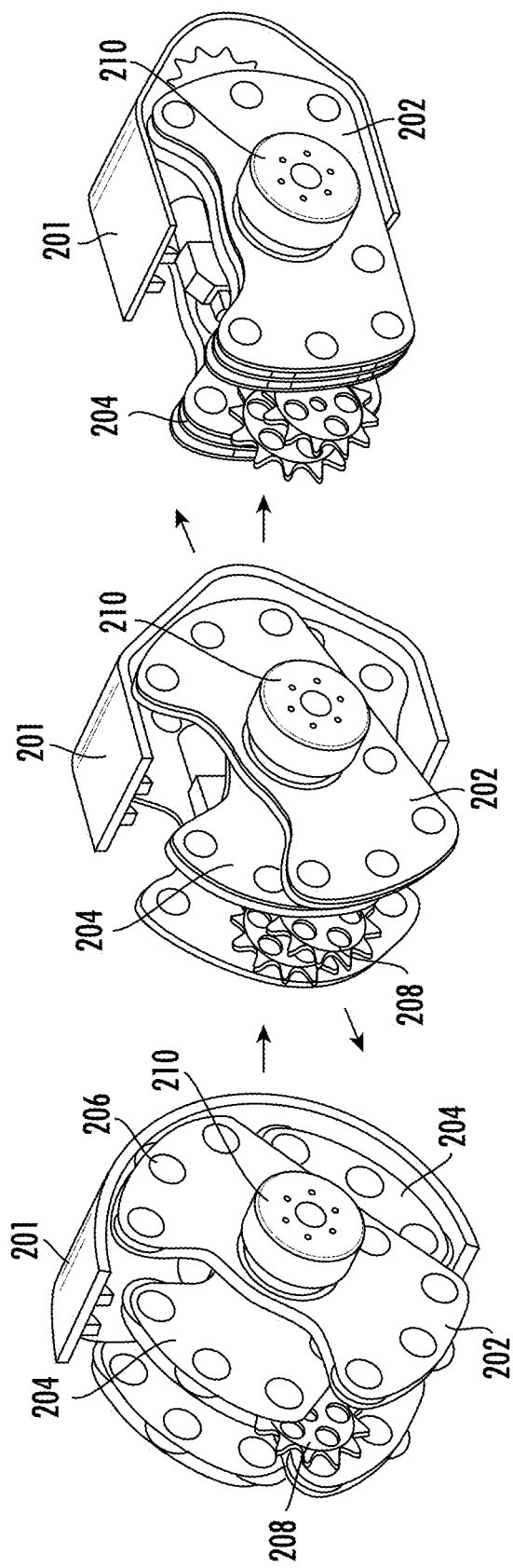

RECONFIGURABLE WHEEL-TRACK ASSEMBLY WITH BOWTIE CONFIGURATION

RELATED APPLICATIONS

This application is a national phase filing under 35 U.S.C. § 371 claiming the benefit of and priority to International Patent Application No. PCT/US2020/030395, filed Apr. 29, 2020, which claims the benefit of U.S. Provisional Patent Application No. 62/840,201, filed Apr. 29, 2019, the contents of which are incorporated herein in their entirety.

GOVERNMENT RIGHTS

This invention was made with government support under contract W56HZV-16-C-0026 awarded by the DARPA. The government has certain rights in the invention.

BACKGROUND

Most wheeled vehicles are designed for efficient movement on hard road surfaces and packed dirt roads but struggle to operate on more extreme off-road terrains. Converting a wheeled vehicle to a tracked vehicle enables a vehicle to access more extreme terrains. However, this conversion typically comes at the expense of speed, maneuverability, and efficiency of operation on hard road surfaces.

Conversion of a wheeled vehicle to a tracked vehicle is currently accomplished through commercially available track conversion kits. Conversion requires complete removal of the wheels and installation of a track unit in place of each wheel. This process can take an hour or more to complete. Track units typically limit the top speed of the vehicle to 45 miles per hour/70 kilometers per hour or less. Track units cover a breadth of scales, from small consumer-grade all-terrain vehicles with capacities of a few hundred pounds, to large agricultural equipment with capacities of many tons.

A transforming wheel/track unit would transform from wheeled mode to track mode and back without the need for replacement of the wheels with track units and vice versa. Preferably, a transforming wheel/track unit would be able to transform between modes while the vehicle is in motion. There are currently no commercially available transforming wheel/track units. As such, it would be desirable to have a vehicle equipped with transport units that can convert on-the-fly between wheeled and track modes.

SUMMARY OF THE INVENTION

The Reconfigurable Wheel-Track (RWT) is a novel mechanism that allows a wheel to transform into a track, and vice versa. The wheel shape enables quick travel over smooth terrains, while the track shape increases surface area and allows for travel over extreme terrains. The RWT consists of several main components and systems: an outer tread, drive mechanisms, support mechanisms, and a reconfiguration mechanism that facilitates the wheel-to-track/track-to-wheel shape transitions.

In the wheel state, the outer tread is supported by a plurality of generally bowtie-shaped support members that form the round wheel shape. The bowtie-shaped support members are locked in place, maintaining the round wheel shape. When transitioning, gravity and ground forces on the outer tread allows the transition from wheel to track shape to occur, and vice versa.

A novelty of this invention is that the shape transition of the RWT can occur on-the-fly, i.e. while the vehicle is in motion. This transition is accomplished by a differential gearbox and braking system. In the wheel mode, the entire RWT, including the tread and assembly comprising a drive mechanism, a reconfiguration mechanism and a braking mechanism, are rotating. As the braking mechanism engages, the assembly is brought to a stop, while the outer tread continues to move the vehicle at a constant speed, driven by a differential gearbox and a plurality of sprockets that engage the outer tread.

BRIEF DESCRIPTION OF THE DRAWINGS

FIG. 2 shows the transition, in View (B) of the assembly from wheel mode, in View (A) to track mode, in View (C).

DETAILED DESCRIPTION

The reconfigurable wheel-track (RWT) is a mechanical device with electronics for sensing, actuation, and controls that allows a wheel to transform into a track, and vice versa. The wheel permits a vehicle to travel quickly over smooth and semi-rough terrain, then transform rapidly into a powered track for crossing extreme terrain. The RWT consists of several main components: an outer tire/tread, a plurality of support members, drive mechanisms for the wheel and track, a reconfiguration mechanism that facilitates the transition from a wheel to a track and vice versa, and electronics for actuating, sensing, and control. In the wheel state, the tread is locked in place and held rigidly around the circumference by the support members. Transition to the track mode is accomplished by actuating specialized mechanisms that move the support members in a way that such a new shape is attained. Once in the track mode, the tread is driven by the track drive sprockets. Transition between states is accomplished on-the-fly, while the vehicle is in motion.

Figure 1A:
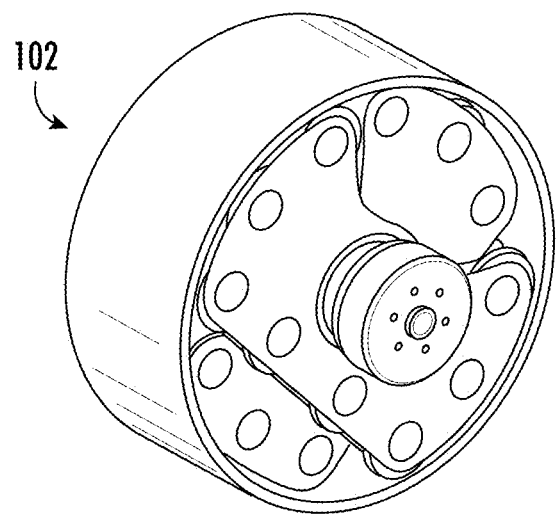
FIG. 1 shows, in View (A) the assembly in wheeled mode and, in View (B), the assembly and track mode
Figure 1B:
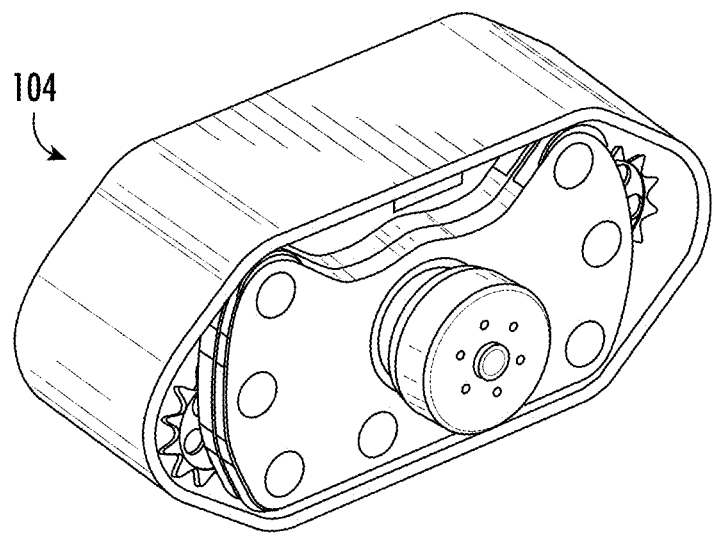

Disclosed herein is a configuration that enables the RWT to reconfigure from a round wheel to an elongated track, referred to herein as a "bowtie" configuration, because the support members are generally bowtie-shaped, as shown in FIG. 1. View (A) of FIG. 1 shows the assembly in wheel mode, while View (B) shows the assembly in track mode.

Figure 4:
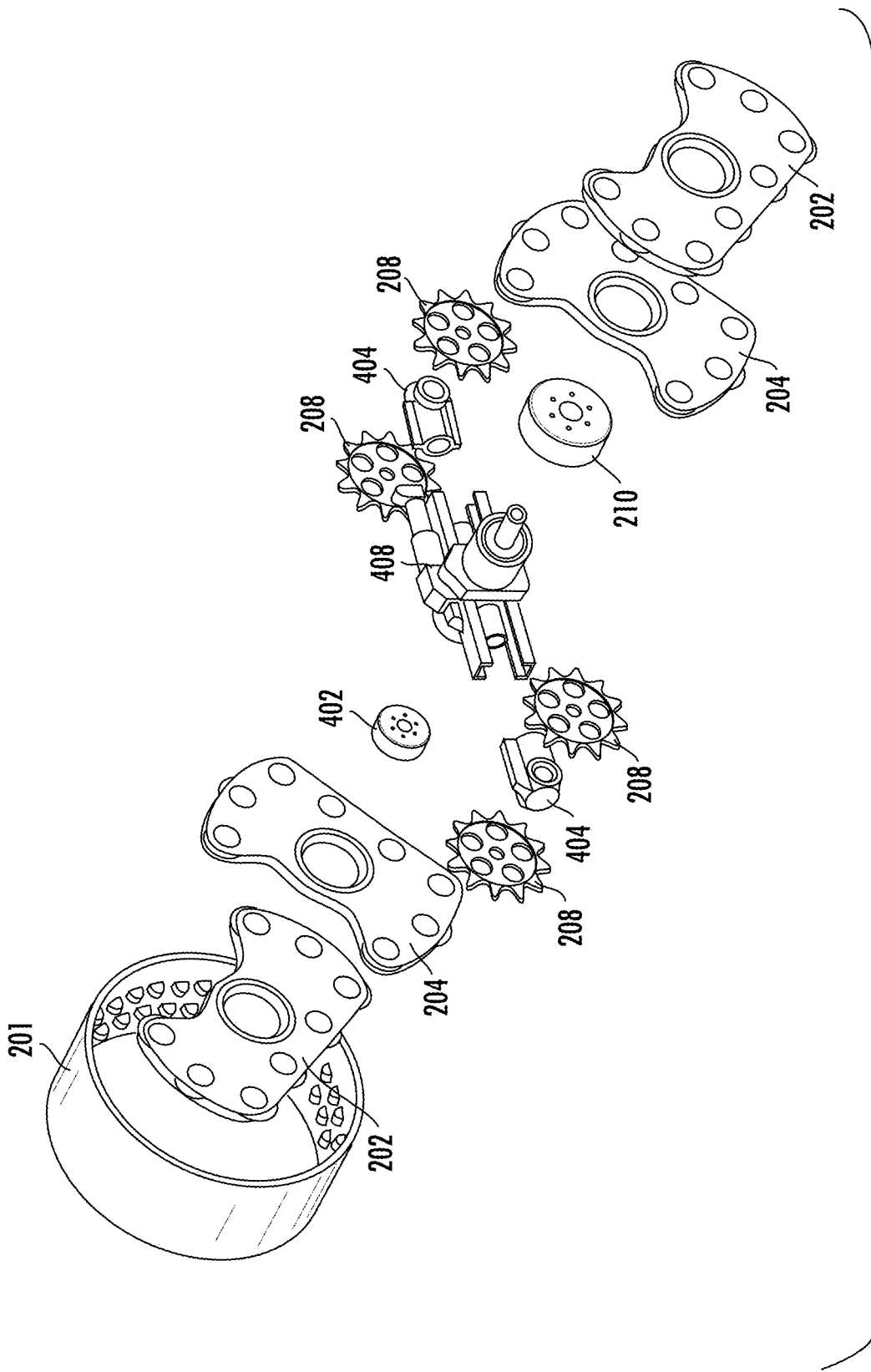
FIG. 4 is an exploded view of the assembly.

FIG. 2 shows the transition of the assembly from wheel mode to track mode. In wheel mode, shown in View (A), tread 201 is held in a generally circular shape by two sets of support members comprising support members 202 and 204, one set of support members on the inner, vehicle side of the assembly and the other set of support members on the outer side of the assembly. Other embodiments of the invention may be configured with additional support members. In a preferred embodiment, each support member 202, 204 is configured with a plurality of bogies 206 integrated into the edges of the support members 202, 204. Bogies 206 are able to rotate freely with respect to the support member. In preferred embodiments, when in wheel mode, each side of tread 201 is supported by 12 support bogies, three at the outer edges of each support member 202, 204, as shown in View (A) of FIG. 2. When in wheel mode, support members 202,204 are rotated at an approximate 45° angle from a horizontal. Sprockets 208 retract into the hub of the assembly but still remain in contact with the tread 201. Because sprockets 208 are locked and prevented from rotating when in wheel mode, the contact between sprockets 208 and tread 201 prevent tread 201 from rotating independently of the assembly when the device is in wheel mode. When in wheel mode, assembly brake 210 is disengaged, allowing the entire assembly to rotate with respect to the vehicle, driven by the shaft of the vehicle. In this configuration, a sprocket brake, shown as reference 402 in FIG. 4, is engaged, preventing the sprockets from being driven by the shaft of the vehicle.

The transition from wheel mode to track mode is shown in View (B) of FIG. 2. During the transition, assembly brake 210 is engaged, slowing the rotation of the inner mechanism of the assembly, while still allowing tread 201 to rotate at full speed. Support members 202 and 204 begin to rotate toward a horizontal position and sprockets 208 extend to accommodate the new shape of tread 201. In addition, more teeth on sprockets 208 are brought into contact with tread 201. The sprocket brake 402, is disengaged, allowing the sprocket drive gearing and sprockets 208 to rotate with tread 201.

In View (C) of FIG. 2, the assembly is shown in track mode. In this mode, support members 202, 204 are in the fully horizontal position. The assembly brake 210 is fully engaged, preventing the assembly from moving with respect to the vehicle. Sprockets 208 are fully engaged with tread 201 and the sprocket brake 402 is fully disengaged, allowing the shaft of the vehicle to drive tread 201 via sprockets 208. Input power is applied to the sprockets 208 via a planetary differential and sprocket gearing (shown in FIG. 6). Bogies 212, which were formerly not in contact with tread 201 are now in contact with tread 201.

Figure 3:
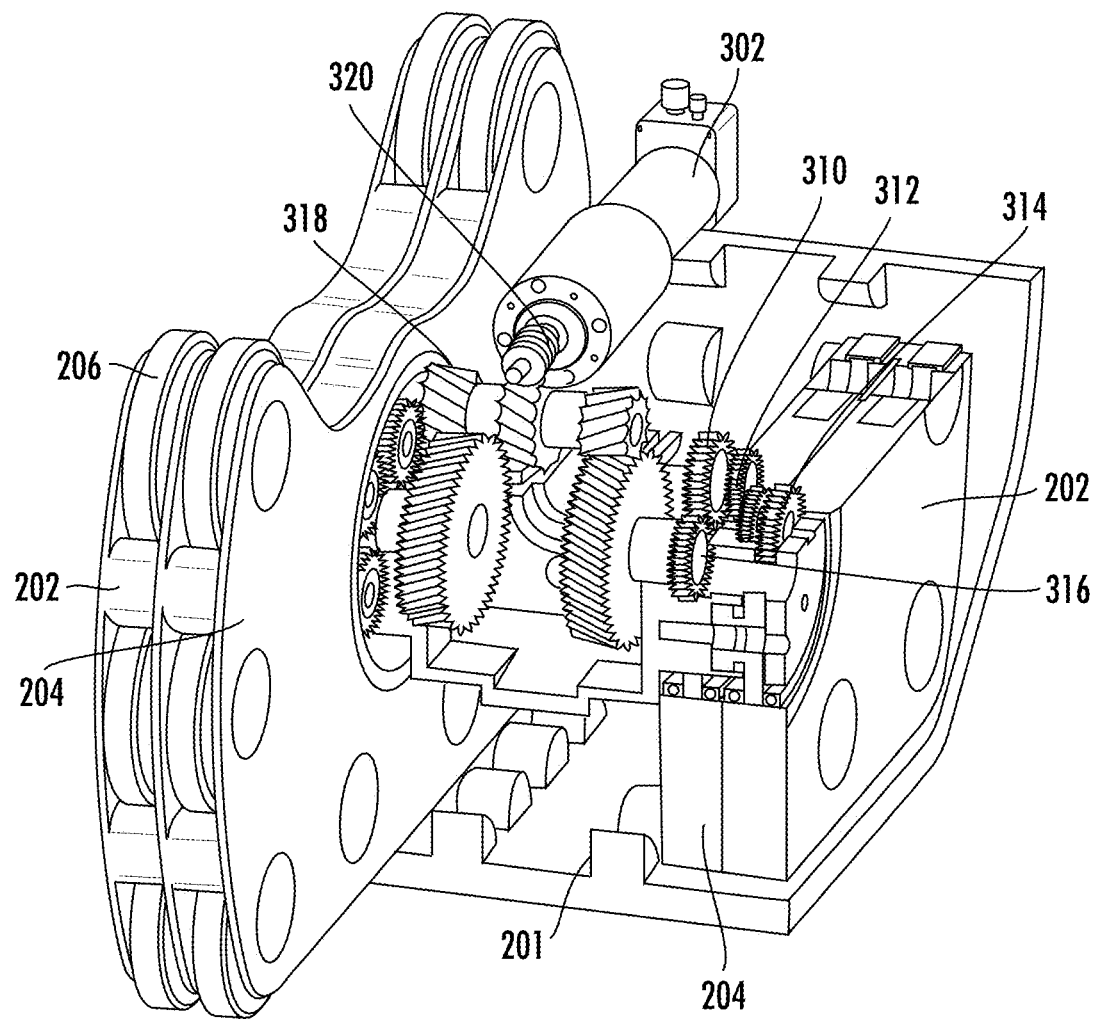
FIG. 3. is a cutaway view of the assembly showing a transition mechanism for rotating the support members from a fully horizontal position, when in track mode to a rotated position, when in wheel mode.

FIG. 3 is a cutaway view of the interior of the assembly. A support member transition mechanism (consisting of drive motor 302, sun gears 316, planet gears 310, 314, reversing gear 312, jackshaft 318 and worm gear 320) is used to rotate support members 202, 204 between the fully horizontal position, as shown in FIG. 3 when the device is in track mode, and the rotated position used when the device is in wheel mode. Drive motor 302 is fitted with a worm gear 320 which engages jackshaft 318. Jackshaft 18 drives two sun gears 316, one sun gear 316 for the inner set of support members 202, 204 and one sun gear 316 for the outer set of support members 202, 204. Each sun gear 316 drives a planet gear 310 which rotates the inner support member 204 of each set of support members in one direction. Planet gear 310 is connected to a second planet gear 314 via reversing gear 312. Second planet gear 314 drives the outer support member 202 of each set of support members in the opposite direction as inner support member 204. In the preferred embodiment, when in wheel mode, longitudinal line of each support member in each set of support members are arranged in an orthogonal configuration with respect to each other, while in track mode, the longitudinal line of each support member in each set of support members are arranged in a parallel configuration with respect to each other.

FIG. 4 shows an exploded view of the mechanism for driving the sprockets when the assembly is in wheel mode. When in wheel mode, sprockets 208 contact tread 201. Sprockets 208 are carried by sprocket carriers 404. Assembly 408 provides articulation of sprockets 208 back and forth to accommodate different shapes of tread 201 during track mode and wheel mode. In addition, assembly 408 also provides power to drive sprockets 208 via the shaft of the vehicle.

Figure 5:
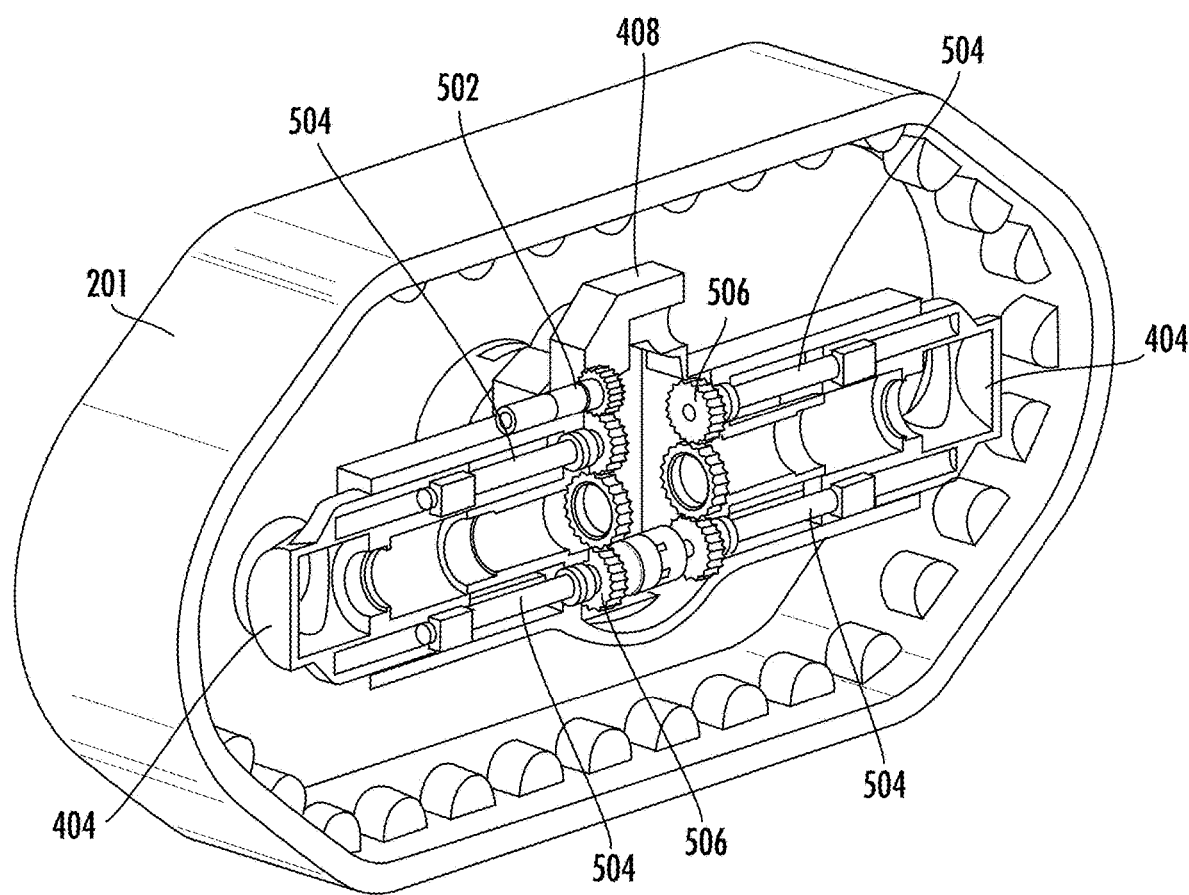
FIG. 5 is a cutaway view of the assembly in track mode showing the mechanism for articulating the sprockets back and forth.

FIG. 5 shows the sprocket configuration mechanism (consisting of shaft 502, drive screws 504, gears 506 and sprocket carriers 404) of assembly 408 for articulating sprockets 208 back and forth to accommodate the different shapes of tread 201 when in track mode and wheel mode. Shaft 502 is connected to drive motor 302, shown in FIG. 3. As shaft 502 is rotated, a series of gears 506 drives screws 504 which articulate sprocket carriers 404 inwardly or outwardly, depending on the direction of rotation. Sprockets 208 are connected to sprocket carriers 404.

Figure 6:
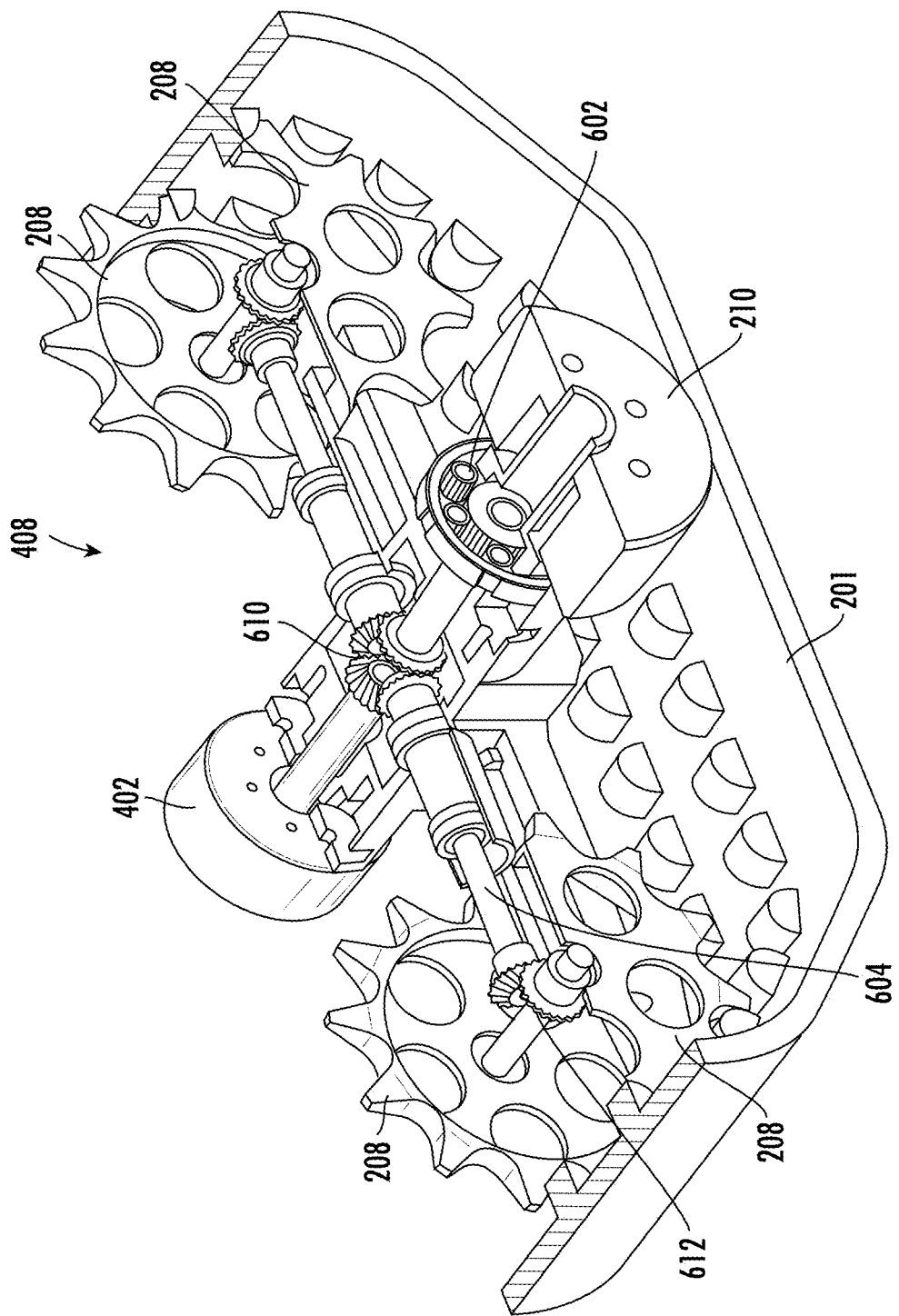
FIG. 6 is a cutaway view of the assembly in track mode showing the mechanism for driving the sprockets when in contact with the tread.

FIG. 6 shows the sprocket driving mechanism (consisting of planetary differential gearing 602, shaft 604, miter gearing 610 and output gearing 612) of assembly 408 for driving sprockets 208 when in track mode. When in track mode, assembly brake 210 is engaged and prevents assembly 408 from rotating with respect to the vehicle. sprocket drive brake 402 is disengaged, allowing sprockets 208 to be driven by the shaft of the vehicle. The shaft of the vehicle (not shown) is coupled to miter gearing 610 via planetary differential gearing 602. Miter gearing 610 drives sprockets 208 via output gearing 612 via splined shaft 604. Shaft 604 is splined to allow the inward and outward articulation of sprockets 208 during the transition between wheel and track modes.

The RWT provides traditional wheeled vehicles access to a much larger variety of terrain. Environments of loose sand, marshes, and deep mud are now more accessible. Steep slopes, large gaps, and higher steps are no longer off limits. It is expected that the RWT will facilitate negotiation of a wide range of terrains and still achieve high top speeds; enable greater maneuverability in difficult environments; augment mission options due to greater terrain access; facilitate diverse payloads due to its ability to lower ground pressure; and enable new vehicle designs.

As would be realized by one of skill in the art, the exact arrangements of components in the foregoing description are provided to explain the invention. Other arrangements are possible and will still be considered within the scope of the invention.

The invention claimed is:

1. A reconfigurable wheel-track device for a vehicle, comprising:
   a tread; and
   an assembly comprising:
      a plurality of support members;
      a support member transition mechanism for transitioning the plurality of support members between a wheel mode and a track mode;
      a sprocket configuration mechanism for articulating a plurality of sprockets between the wheel mode and the track mode; and
      a sprocket driving mechanism for driving the plurality of sprockets when in the track mode;
   wherein the wheel-track device switches between the wheel mode and the track mode when the vehicle is in motion.

2. The device of claim 1, wherein each of the plurality of support members has a generally bowtie-shaped configuration.

3. The device of claim 1, each of the plurality of support members further comprising a plurality of bogies positioned along an outer edge of the support member.

4. The device of claim 3, the plurality of bogies rotating freely with respect to the support member.

5. The device of claim 1, the transition mechanism transitioning the plurality of support members between a fully horizontal configuration when in the track mode and a rotated configuration when in the wheel mode.

6. The device of claim 1, the plurality of support members comprising two sets of two support members, one set of support members disposed on an inner side of the assembly and another set of support members disposed on an outer side of the assembly.

7. The device of claim 6, the support member transition mechanism comprising:
a drive motor; and
gearing, driven by the drive motor, to rotate one support member of each set of support members in a clockwise direction, and the other support member of each set of support members in a counterclockwise direction.

8. The device of claim 7 wherein, when in the wheel mode, a longitudinal line of each support member in each set of support members are in an orthogonal configuration and, when in the track mode, the longitudinal line of each support member in each set of support members are in a parallel configuration.

9. The device of claim 1, the sprocket configuration mechanism articulating a plurality of sprockets between a first position, when in the wheel mode and a second position when in the track mode to accommodate different shapes of the track in each mode.

10. The device of claim 9, the sprocket configuration mechanism comprising:
a drive motor;
a plurality of sprocket carriers, each sprocket carrier coupled to one or more sprockets; and
a plurality of screw members, coupled to the sprocket carriers; and
gearing, driven by the drive motor, to rotate the plurality of screw members which, when rotated, move the plurality of sprocket carriers inwardly or outwardly, depending upon the direction of rotation.

11. The device of claim 1, the sprocket driving mechanism comprising:
a planetary gear, driven by a shaft of the vehicle;
an input shaft, connected to the planetary gear; and
a miter gear, driven by the input shaft, for driving multiple splined sprocket drive shafts.

12. The device of claim 11, the splined sprocket drive shafts allowing the articulation of the sprockets during the transition between the wheel mode and the track mode.

13. The device of claim 11, further comprising:
a sprocket brake; and
a brake shaft coupled to the sprocket drive brake;
wherein the brake shaft is coupled to the miter gear; and
wherein, when in the wheel mode, the sprocket brake is engaged, thereby preventing rotation of the sprockets.

14. The device of claim 1, wherein the assembly and the tread, when in the wheel mode, rotate as a unit, driven by a drive shaft of the vehicle.

15. The device of claim 1, wherein the assembly, when in the track mode, is stationary with respect to the tread.

16. The device of claim 15, further comprising:
an assembly brake;
wherein the assembly brake, when in the track mode, prevents the assembly from rotating with the tread.

17. A method of transitioning the device of claim 1, from the wheel mode to the track mode comprising:
engaging an assembly brake to slow the rotation of the assembly;
engaging the transition mechanism to transition the support members from a wheel mode configuration to a track mode configuration;
engaging the sprocket configuration mechanism to articulate the sprockets toward the outside of the device; and
disengaging a sprocket brake to allow the sprockets to be driven by a shaft of the vehicle.

18. The method of claim 17 wherein, when in the track mode, the assembly is not rotating.

19. A method of transitioning the device of claim 1, from the track mode to the wheel mode comprising:
engaging the sprocket configuration mechanism to articulate the sprockets toward the inside of the device;
engaging a sprocket brake to prevent rotation of the sprockets;
disengaging an assembly brake to allow rotation of the assembly; and
engaging the transition mechanism to transition the support members from a track mode configuration to a wheel mode configuration.

20. The method of claim 19 wherein, when in the wheel mode, the track and the assembly rotate as a unit.

* * * * *